United States Patent
Ishiguro

(10) Patent No.: US 10,754,558 B2
(45) Date of Patent: Aug. 25, 2020

(54) VEHICULAR DEVICE

(71) Applicant: DENSO CORPORATION, Kariya, Aichi-pref. (JP)

(72) Inventor: Hiroshi Ishiguro, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 148 days.

(21) Appl. No.: 15/744,653

(22) PCT Filed: Oct. 26, 2016

(86) PCT No.: PCT/JP2016/081660
§ 371 (c)(1),
(2) Date: Jan. 12, 2018

(87) PCT Pub. No.: WO2017/077909
PCT Pub. Date: May 11, 2017

(65) Prior Publication Data
US 2018/0203622 A1 Jul. 19, 2018

(30) Foreign Application Priority Data
Nov. 2, 2015 (JP) .................. 2015-215949

(51) Int. Cl.
*G06F 12/00* (2006.01)
*G06F 3/06* (2006.01)
(Continued)

(52) U.S. Cl.
CPC ............ *G06F 3/0619* (2013.01); *B60R 16/02* (2013.01); *G06F 3/065* (2013.01); *G06F 3/0685* (2013.01);
(Continued)

(58) Field of Classification Search
CPC ...... G06F 3/0619; G06F 3/065; G06F 3/0685; G06F 9/442
See application file for complete search history.

(56) References Cited

U.S. PATENT DOCUMENTS

2005/0117418 A1* 6/2005 Jewell ................. G06F 11/1441
365/202
2006/0212644 A1* 9/2006 Acton ....................... G06F 1/30
711/103
(Continued)

FOREIGN PATENT DOCUMENTS

| JP | 2004219373 A | 8/2004 |
| JP | 2005162190 A | 6/2005 |

(Continued)

*Primary Examiner* — Gurtej Bansal
(74) *Attorney, Agent, or Firm* — Harness, Dickey & Pierce, P.L.C.

(57) ABSTRACT

A vehicular device includes: a function processing unit that executes an application software; a volatile memory that temporarily stores a backup data; and a backup processing unit that copies the backup data from the volatile memory to a non-volatile memory when an event for terminating an operation occurs. The function processing unit and the backup processing unit execute processes independently, and are accessible to a same memory space in the volatile memory, respectively. The function processing unit reads out the backup data from the volatile memory and reboots the application software when an event for maintaining an activation occurs while the backup processing unit is storing the backup data from the volatile memory to the non-volatile memory.

6 Claims, 4 Drawing Sheets

(51) Int. Cl.
 *G06F 11/14* (2006.01)
 *B60R 16/02* (2006.01)
 *G06F 9/4401* (2018.01)
 *G06F 9/46* (2006.01)
 *G06F 9/445* (2018.01)

(52) U.S. Cl.
 CPC .............. *G06F 9/442* (2013.01); *G06F 9/461* (2013.01); *G06F 11/1458* (2013.01); *G06F 9/445* (2013.01); *G06F 11/1441* (2013.01); *G06F 2201/84* (2013.01); *G06F 2212/173* (2013.01)

(56) References Cited

U.S. PATENT DOCUMENTS

| | | | | |
|---|---|---|---|---|
| 2014/0058871 | A1* | 2/2014 | Marr | G06F 9/45533 705/26.1 |
| 2014/0325116 | A1* | 10/2014 | McKelvie | G06F 12/0246 711/103 |
| 2015/0057838 | A1* | 2/2015 | Scholl | H04W 4/046 701/2 |

FOREIGN PATENT DOCUMENTS

| | | | |
|---|---|---|---|
| JP | 2007065753 A | 3/2007 | |
| JP | 2012066657 A | 4/2012 | |

* cited by examiner

VEHICULAR DEVICE

CROSS REFERENCE TO RELATED APPLICATIONS

This application is a U.S. National Phase Application under 35 U.S.C. 371 of International Application No. PCT/JP2016/081660 filed on Oct. 26, 2016 and published in Japanese as WO 2017/077909 A1 on May 11, 2017. This application is based on and claims the benefit of priority from Japanese Patent Application No. 2015-215949 filed on Nov. 2, 2015. The entire disclosures of all of the above applications are incorporated herein by reference.

TECHNICAL FIELD

The present disclosure relates to a vehicular device that stores a backup data into a non-volatile memory.

BACKGROUND ART

Conventionally, a technique is well known such that a backup data of a vehicular device such as a vehicular navigation device and an EMV (electro multi vision system), which is supplied energy from a power source of a vehicle, is stored in a non-volatile memory. The non-volatile memory has the limitation of the number of storing times, and it is necessary to perform a process such as a charge correction process in case of read out. Thus, when the non-volatile memory is used in the vehicular device, it is necessary to limit the number of storing times and the number of read out times for the non-volatile memory in view of long term stability of the non-volatile memory. Accordingly, with respect to a large amount of data and frequently updated data, a suitable action is taken for the data to store in the non-volatile memory when an accessory switch turns off.

When a large amount of data or frequently updated data is stored in the non-volatile memory, it takes too much time to store the data. Even if the accessory power source turns on again while storing the data, a conventional technique cannot suspend storing the data into the non-volatile memory, and reboot an application software in the vehicular device. Thus, a difficulty arises that the reboot process time is increased.

However, for example, the Patent Literature 1 discloses a technique for continuing a power supply to the vehicular device for a predetermined period and maintaining an activation state of the vehicular device after a vehicular switch turns off. In the Patent Literature 1, using this technique, just after the vehicular switch turns on, the vehicular device is in an available state.

However, even when the technique disclosed in the Patent Literature 1 is applied, it is necessary to suspend a reboot of an application software in the vehicular device until a storing process is completed in a case where an user turns on the vehicular switch at a timing during the backup data is being stored in the non-volatile memory.

PRIOR ART LITERATURES

Patent Literature

Patent Literature 1: JP-2005-162190-A

SUMMARY

It is an object of the present disclosure to provide a vehicular device for restricting a delay of an activation time when an application software is rebooted while a backup data is being stored in a non-volatile memory.

According to an aspect of the present disclosure, a vehicular device for a vehicle includes: a function processing unit that is configured to execute an application software relating to a service for an user of a vehicle; a volatile memory that is configured to temporarily store a backup data which is necessary for the application software; and a backup processing unit that is configured to store and copy the backup data from the volatile memory to a non-volatile memory when an event for terminating an operation of the vehicular device occurs. The function processing unit and the backup processing unit execute processes independently from each other, and the function processing unit and the backup processing unit are accessible to a same memory space in the volatile memory, respectively. The function processing unit reads out the backup data, stored in the volatile memory, from the volatile memory and reboots the application software when an event for maintaining an activation of the vehicular device occurs while the backup processing unit is storing the backup data from the volatile memory to the non-volatile memory.

The function processing unit and the backup processing unit execute processes independently from each other. Thus, the function processing unit executes the process when the event for terminating the operation of the vehicular device occurs while the backup processing unit is storing the backup data from the volatile memory to the non-volatile memory. Further, the function processing unit and the backup processing unit are accessible to the same memory space in the volatile memory, respectively. Thus, the function processing unit reads out the backup data stored in the volatile memory even when the backup processing unit is storing the backup data from the volatile memory to the non-volatile memory.

Accordingly, the function processing unit reboots the application software without waiting for the completion of the storage of the backup data when the event for maintaining the operation of the vehicular device even in a case where the backup data is being stored from the volatile memory to the non-volatile memory since the event for terminating the operation of the vehicular device occurs. As a result, the delay of the activation time in a case where the application software is rebooted is restricted since it is not necessary to wait for the completion of the storage of the backup data.

BRIEF DESCRIPTION OF DRAWINGS

The above and other objects, features and advantages of the present disclosure will become more apparent from the following detailed description made with reference to the accompanying drawings. In the drawings.

EMBODIMENTS

First Embodiment

<Schematic Structure of a Vehicular System 1>

Figure 1:
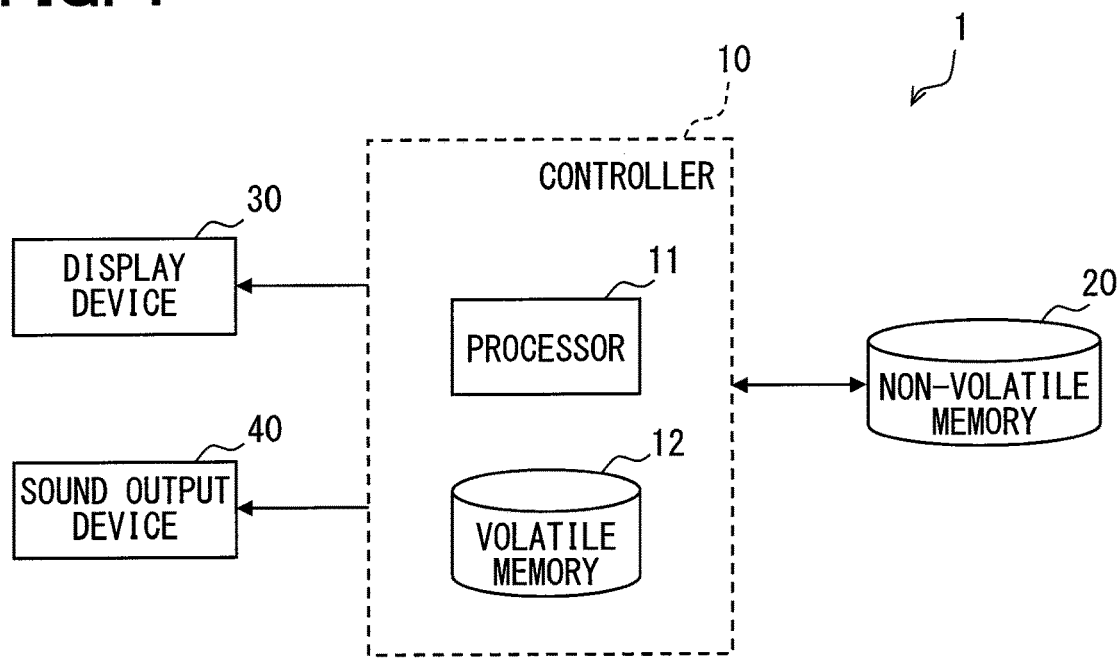
FIG. 1 is a diagram showing an example of a schematic structure of a vehicular system 1.

A first embodiment according to a present disclosure will be explained with respect to drawings. The vehicular system 1 shown in FIG. 1 is mounted on a vehicle. The system 1 includes a control device 10, a non-volatile memory 20, a display device 30 and a sound output device 40. Hereafter, the vehicle on which the control device 10 is mounted is defined as a subject vehicle.

The non-volatile memory 20 is an external memory device for the control device 10. The memory 20 is a HDD, SD card or a flash memory. For example, the non-volatile memory 20 may be an embedded multi-media card using a flash memory.

The display device 30 may be a display for displaying a text and an image. The sound output device 40 may be a speaker. The display device 30 and the sound output device 40 displays and outputs a sound according to an instruction from the control device 10, respectively.

The control device 10 is a normal computer. As shown in FIG. 1, the control device 10 includes a processor 11 and a volatile memory 12. The volatile memory 12 may be a DRAM (dynamic random access memory). Although not shown in the drawings, the control device 10 may include a I/O element and a bus. The control device 10 may include a graphic chip and a display controller. The control device 10 corresponds to the vehicular device.

In the first embodiment, for example, when an accessory (i.e., ACC) power source of the subject vehicle turns on, the control device 10 is activated. When the ACC power source of the subject vehicle turns off, the function of the control device 10 is shut down. Accordingly, the turning off of the ACC power source corresponds to an event of the shut-down of the function of the vehicular device.

<Schematic Structure of the Processor 11>

Figure 2:
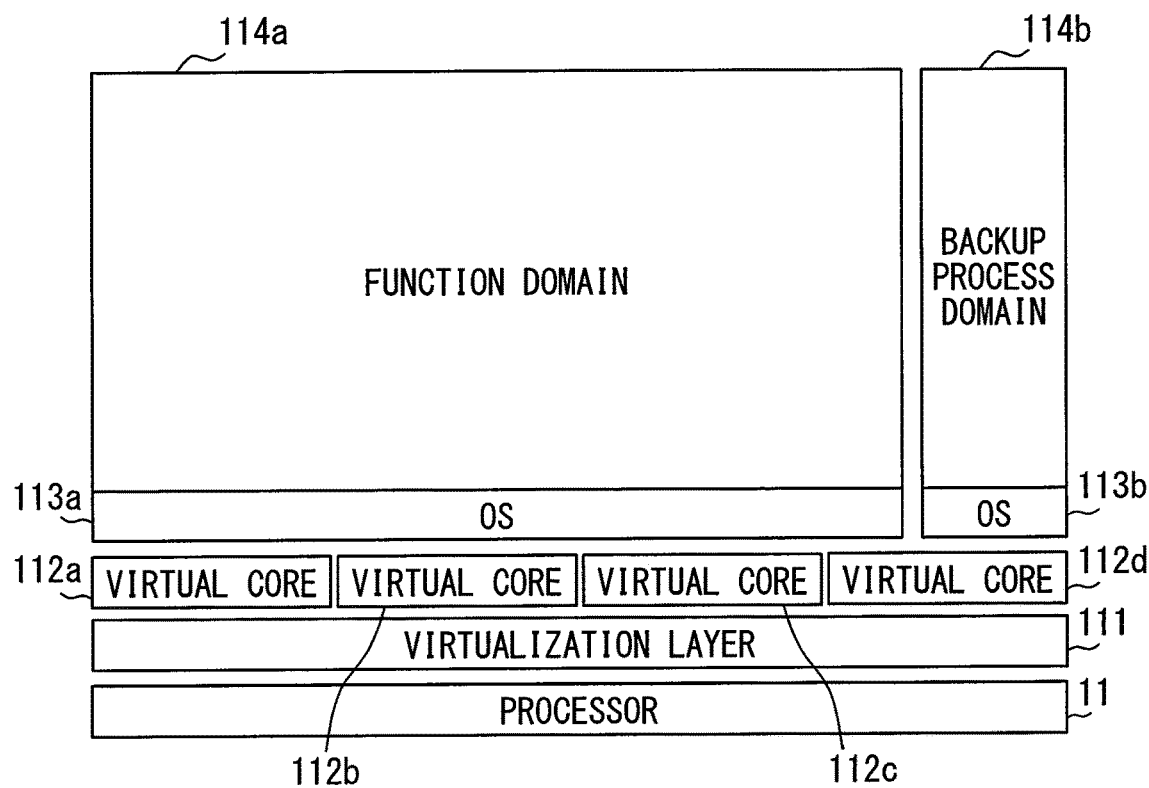
FIG. 2 is a diagram explaining a schematic structure of a processor 11.

Next, using FIG. 2, the schematic structure of the processor 11 will be explained. The processor 11 may have a single core structure including one CPU (i.e., central processing unit). Alternatively, the processor 11 may have a multi-core structure including multiple CPUs. The processor 11 corresponds to a physical processor.

The processor 11 operates virtual cores 112a-112d in parallel using a virtualization technique for operating virtually as multiple cores exists, by using and time-sharing a resource of the processor 11 itself with a clock unit. The virtual cores 112a-112d correspond to virtual processor cores. The virtualization technique is, in general, defined as a virtualization. For example, a method of the virtualization may be a hypervisor or the like.

The processor 11 mounts a virtualization layer 111 as a software for performing a virtualization by controlling an operating state of the virtual cores 112a-112d. Here, the first embodiment will be explained as an example such that the processor 11 provides four virtual cores 112a-112d. The number of the virtual cores may be different from four.

The processor 11 operates multiple OSs (i.e., operating systems) 113a, 113b independently and in parallel over the virtual cores 112a-112d. Each OS 113a, 113b corresponds to a fundamental software.

On the OS 113a, a functional domain 114a is assigned as a domain for executing an application software. On the OS 113b, a backup processing domain 114b is assigned as a domain for performing a backup process in a case where a system is terminated. The functional domain 114a corresponds to a function processing unit. The backup processing domain 114b corresponds to a backup processing unit. In the first embodiment, the virtual core occupied by the OS 113b for operating the backup processing domain is less than one virtual core.

The timing of the termination of the system is the timing of turning off the ACC power source of the subject vehicle. The backup process is a process for storing and writing a backup data, which is necessary for the application software executed in the functional domain 114a, from the volatile memory 12 to the non-volatile memory 20. The domain shows a process unit which performs a process independently and accesses the same memory space in the volatile memory 12.

Here, as an example, the application software executed by the functional domain 114a is an application software relating to a multi media apparatus such as an application software relating to a navigation function and an application software relating to an audio function. For example, when the application software is the application software relating to the navigation function, the backup data may include a data of a current position information, a route information searched, and a last mode information.

The first embodiment describes a constitution such that the number of the functional domain 114a is one. Alternatively, the number of the functional domains 114a may be plural. For example, the functional domain for executing various application software relating to the multi media apparatus and the functional domain for executing various application software relating to a driving support may be assigned to different OSs, respectively.

<Process in the Processor 11>

Next, the process in the processor 11 will be explained. In the processor 11, the functional domain 114a executes the application software relating to the multi media apparatus when the control device 10 is activated. The functional domain 114a executes the application software while storing the data, to be used in the application software under execution, into the volatile memory 12. Further, in the processor 11, the backup processing domain 114b executes the backup process when the ACC power source of the subject vehicle turns off. The processor 11 controls the power source of the control device 10 to turn off when the backup process is completed.

Hereafter, the process in the processor 11 will be explained in each state such as a normal activation state, a normal shut-down state and a reboot state during the backup process. Here, the normal activation state shows a situation such that the control device 10 is activated when the ACC power source of the subject vehicle turns on and the control device 10 also turns on. The normal shut-down state shows a situation such that the control device 10 starts to execute the backup process at a timing as a trigger when the ACC power source of the subject vehicle turns off, and the power source of the control device 10 turns off after the backup process is completed. The reboot state shows a situation such that the control device 10 starts to execute the backup process at a timing as a trigger when the ACC power source of the subject vehicle turns off, and the activation of the control device 10 is maintained since the ACC power source turns on while executing the backup process.

<Normal Activation State>

Figure 3:
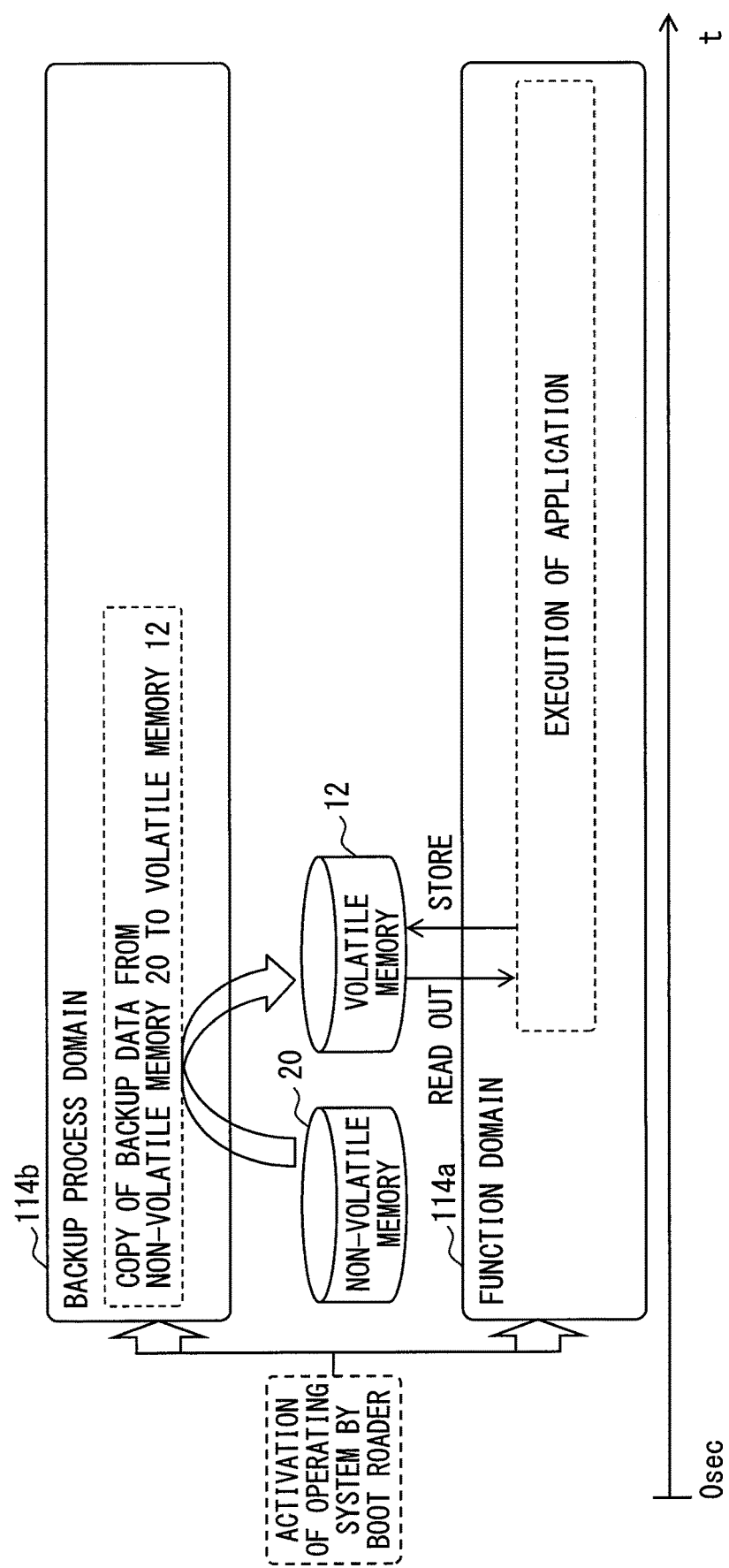
FIG. 3 is a diagram explaining a process in the processor 11 in a normal activation case.

First, using FIG. 3, the process of the processor 11 in the normal activation state will be explained. When the ACC power source of the subject vehicle turns on, and the control device 10 is activated, a boot loader (i.e., a boot loader) activates the OSs 113a, 113b. After activating the OSs 113a, 113b, the backup processing domain 114b assigned in the OS 113b stores (i.e., copies) the backup data, which is stored in the non-volatile memory 20, into the volatile memory 12. On the other hand, the functional domain 114a assigned in the OS 113a executes the application software using the backup data stored in the volatile memory 12 after the backup processing domain 114b stores the backup data into the volatile memory 12.

Thus, the volatile memory 12 is a shared memory between the functional domain 114a and the backup processing domain 114b. Thus, the functional domain 114a and the backup processing domain 114b are accessible to the same memory space. The control device 10 utilizes the virtualization technique so that it is easy to realize a construction such that the functional domain 114a and the backup processing domain 114b access the same memory space.

<Normal Shut-Down State>

Figure 4:
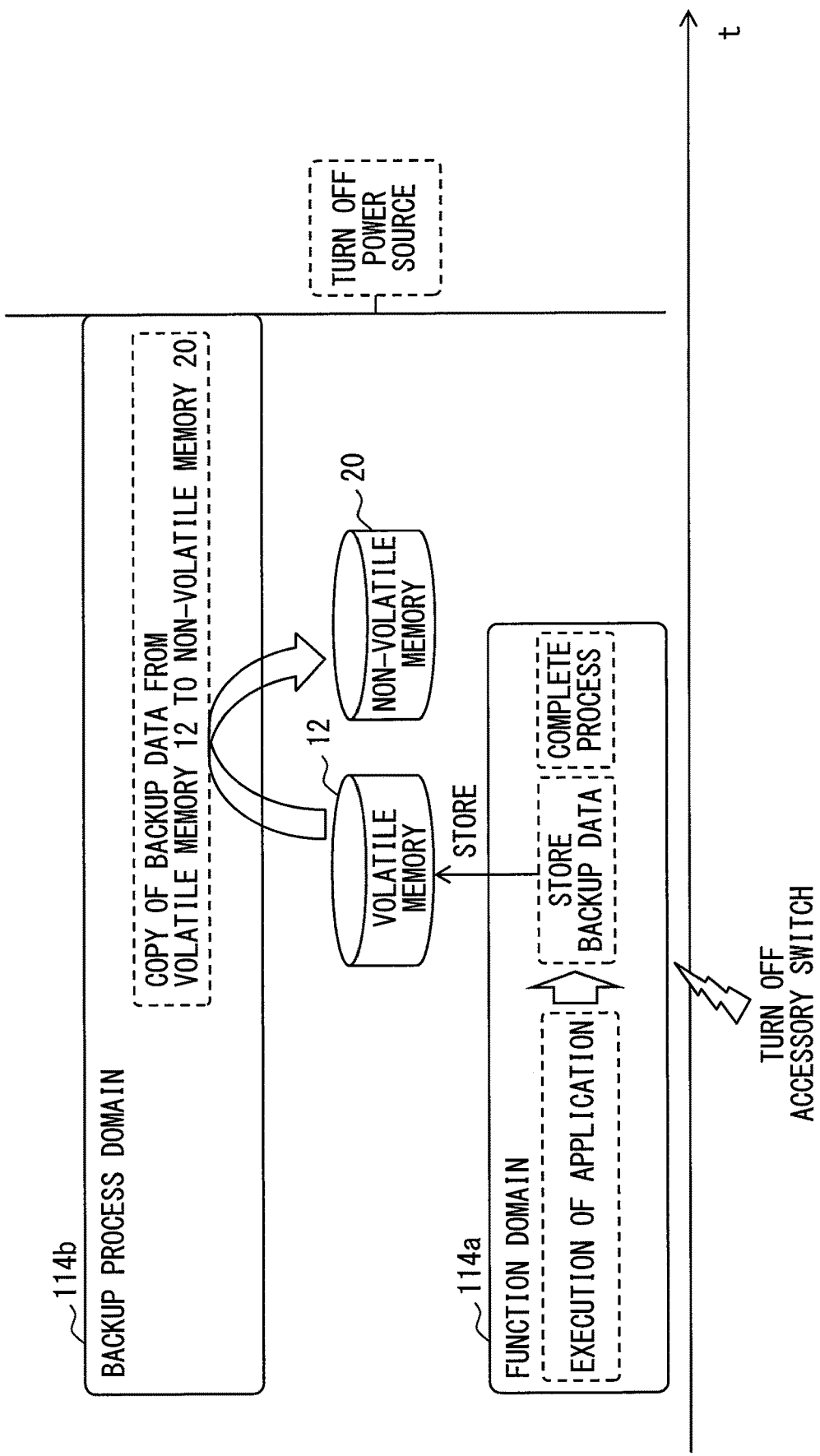
FIG. 4 is a diagram explaining a process in the processor 11 in a normal shut down case.

Next, using FIG. 4, the process in the processor 11 in a normal shut-down state will be explained. When the ACC power source of the subject vehicle turns off so that the operation of the control device 10 is terminated, the functional domain 114a stores the backup data, which is necessary for the reboot step of the application software, into the volatile memory 12. After the backup data is stored in the volatile memory 12, the process in the functional domain 114a is terminated. The memory in which the functional domain 114a stores the backup data is the volatile memory 12. Accordingly, the access speed is high. Thus, it does not take much time to complete the storage of the backup data, and therefore, it is possible to transfer rapidly to the termination of the process after that.

The backup processing domain 114b starts to execute the backup process for storing (i.e., copying) the backup data, which is stored in the volatile memory 12, into the non-volatile memory 20 after the functional domain 114a stores the backup data into the volatile memory 12. After the storage of the backup data into the non-volatile memory 20 in the backup process is completed, the power source of the control device 10 turns off.

<Reboot State during the Backup Process>

Figure 5:
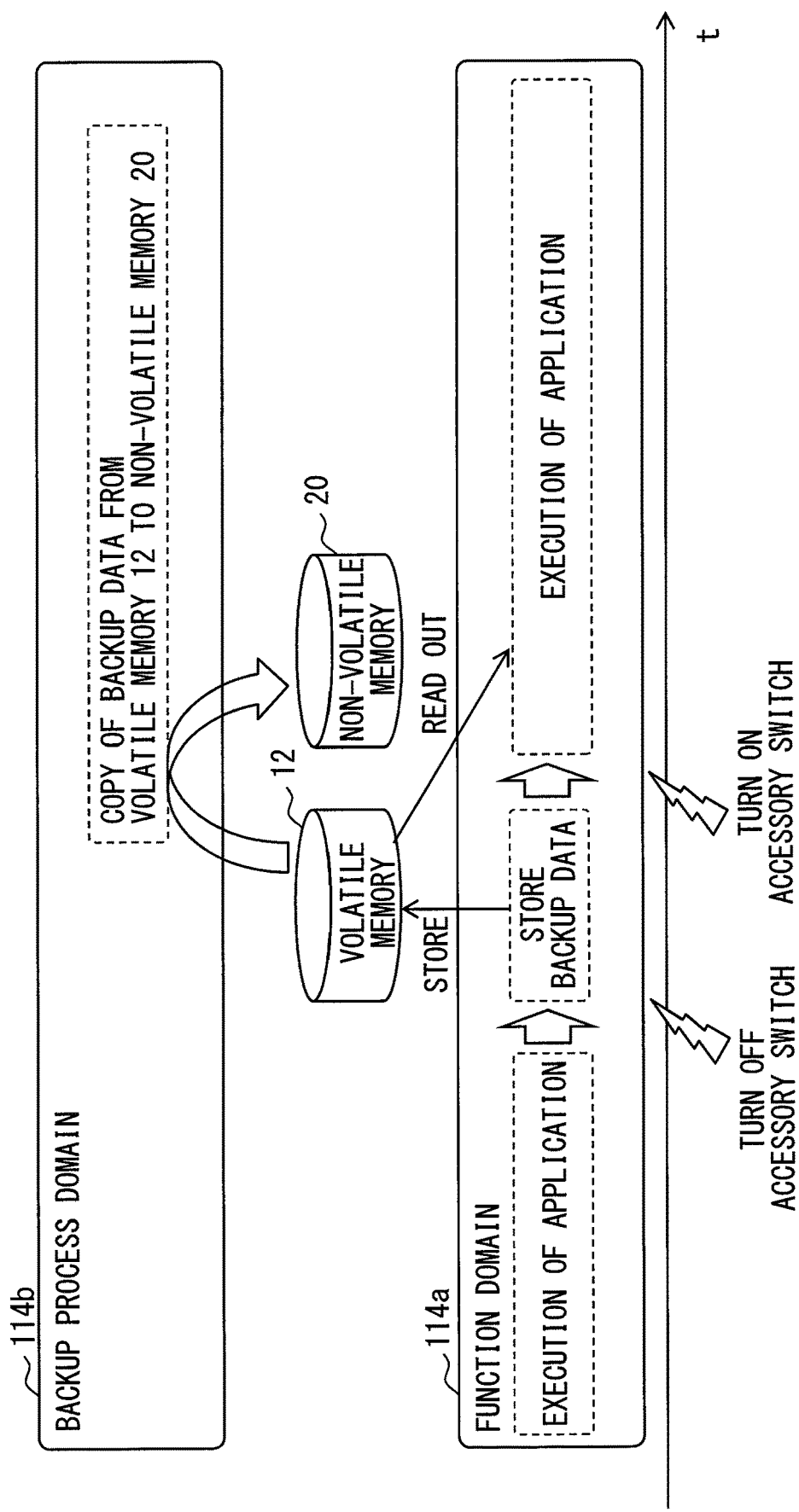
FIG. 5 is a diagram explaining a process in the processor 11 in a reboot case during a backup process.

Next, using FIG. 5, the process of the processor 11 in the reboot state during the backup process will be explained. Similar to the above described normal shut-down state, when the operation of the control device 10 is terminated with a trigger such that the ACC power source of the subject vehicle turns off, the functional domain 114a stores the backup data into the volatile memory 12. As explained above, it does not take much time to complete the storage of the backup data into the volatile memory 12. Similar to the above described normal shut-down state, the backup process starts after the functional domain 114a stores the backup data into the volatile memory 12. Thus, the turning off of the ACC power source of the subject vehicle corresponds to an event such that the operation of the vehicular device.

Here, when the turning-on of the ACC power source of the subject vehicle occurs before the backup process is completed, the functional domain 114a reboots the application software without waiting for the completion of the backup process since the functional domain 114a functions independently from the backup processing domain 114b. The turning-on of the ACC power source of the subject vehicle occurred before the completion of the backup process corresponds to an event for maintaining the activation of the vehicular device.

During the backup process, since the power source of the control device 10 does not turn off yet, the volatile memory 12 keeps storing the backup data. Thus, the application software which is rebooted continuously utilizes the backup data which is stored in the volatile memory 12, so that the application software is rebooted rapidly.

Even when the functional domain 114a reads out or rewrites the backup data in the volatile memory 12, the backup process is not affected since the backup processing domain 114b reads out the backup data from the volatile memory 12 and stores the backup data into the non-volatile memory 20 independently from the functional domain 114a.

Thus, in the above constitution, even when the rebooting application software is an application software, which is necessary to reboot within a predetermined period, such as an application software relating to a display of an image from a rear view camera, a display of an opening animation image, or a dead reckoning, activation performance requirements are satisfied.

Summary of the First Embodiment

According to the constitution of the first embodiment, the functional domain 114a reads out the backup data stored in the non-volatile memory 12 even when the ACC power source of the subject vehicle turns off while the backup processing domain 114b is copying the backup data from the volatile memory 12 to the non-volatile memory 20. Accordingly, the functional domain 114a reboots the application software without waiting for the completion of the storage of the backup data when the ACC power source of the subject vehicle turns on while the backup data is copying from the volatile memory 12 to the non-volatile memory 20. As a result, the delay of the activation time in a case where the application software is rebooted is restricted since it is not necessary to wait for the completion of the storage of the backup data.

In the constitution of the first embodiment, the power source of the control device 10 turns off after the completion of the backup process, and therefore, it is possible to restrict a dark current, compared with a case where the volatile memory 12 continues storing the data using the battery power source. Thus, the constitution of the first embodiment is specifically suitable for the control device 10 having large electric power consumption since a CPU power is large, such as the control device 10 for executing the application software relating to the multi media apparatus and a driving support system.

First Modification

The first embodiment describes a feature such that multiple OSs 113a, 113b function over multiple virtual cores 112a-112d using the virtualization technique. It is not necessary to limit the feature. For example, without using the virtualization technique, different processors arranged on the same memory bus may operate multiple OSs 113a, 113b, respectively.

When the different processors operate multiple OSs 113a, 113b, respectively, the backup processing domain 114b assigned to the OS 113b and the functional domain 114a assigned to the OS 113a access the same memory space in the volatile memory 12.

Second Modification

The first embodiment describes a feature such that the control device 10 is activated when the ACC power source of the subject vehicle turns off, and the operation of the control device 10 is terminated when the ACC power source turns off. It is not necessary to limit the feature. The event as a trigger for activation and the termination of the operation of the control device 10 may be different from an event such that the ACC power source turns on and off. For example, the trigger may be an event such that an ignition power source of the subject vehicle turns on and off.

Third Modification

The first embodiment describes a feature such that the non-volatile memory 20 is an external storage device of the control device 10. It is not necessary to limit the feature. For example, the non-volatile memory 20 may be built in the control device 10.

Fourth Embodiment

The first embodiment describes a feature such that the backup processing domain 114b turns off the power source of the control device 10 after completing the backup process. It is not necessary to limit the feature. For example, the functional domain 114a may turn off the power source of the control device 10 after completing the backup process. In this case, the functional domain 114a stands by to be in a state for waiting for the completion of the backup process until the backup process is completed after the application software is terminated. Thus, after the backup process is completed, the power source of the control device 10 may turn off.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A vehicular device for a vehicle comprising:
    a function processing unit that is configured to execute an application software relating to a service for a user of a vehicle;
    a volatile memory that is configured to temporarily store a backup data which is necessary for the application software; and
    a backup processing unit that is configured to copy the backup data from the volatile memory to a non-volatile memory when an event for terminating an operation of the vehicular device occurs, wherein:
    the function processing unit and the backup processing unit execute processes independently from each other, and the function processing unit and the backup processing unit are accessible to a same memory space in the volatile memory, respectively;
    the function processing unit reads out the backup data, stored in the volatile memory, from the volatile memory and reboots the application software when an event for maintaining an activation of the vehicular device occurs while the backup processing unit is copying the backup data from the volatile memory to the non-volatile memory, the function processing unit rebooting the application software without waiting for the copying of the backup data from the volatile memory to the non-volatile memory to be completed, when the event for maintaining the activation of the vehicle device occurs;
    each of the function processing unit and the backup processing unit is a processing unit operated by a different operating system among a plurality of operating systems functioning in a physical processor with a virtualization technique;
    the physical processor is abstracted to a plurality of virtual processor cores by the virtualization technique; and
    one of the operating systems for operating the backup processing unit utilizes a portion of one of the virtual processor cores.

2. The vehicular device according to claim 1, wherein:
    the backup processing unit copies the backup data into an external storage medium as the non-volatile memory, the external storage medium being external to the vehicular device.

3. The vehicular device according to claim 1, wherein:
    the portion of the one of the virtual processor cores utilized by the one of the operating systems is less than a whole of the one of the virtual processor cores.

4. The vehicular device according to claim 1, wherein:
    one of the operating systems for operating the function processing unit utilizes another portion of the one of the virtual processor cores, the operating system for operating the backup processing unit and the operating system for the function processing unit sharing the one of the virtual processor cores.

5. The vehicular device according to claim 1, wherein:
    when the event for terminating the operation of the vehicular device occurs, the function processing unit terminates an operation without waiting for the copying of the backup data into the non-volatile memory by the backup processing unit to be completed.

6. The vehicular device according to claim 5, wherein:
    the backup processing unit turns off a power source of the vehicular device after the copying of the backup data into the non-volatile memory is completed.

* * * * *